April 28, 1925.
O. E. ZSCHUNKE
VEHICLE HEADLIGHT
Filed Dec. 28, 1923
1,535,282
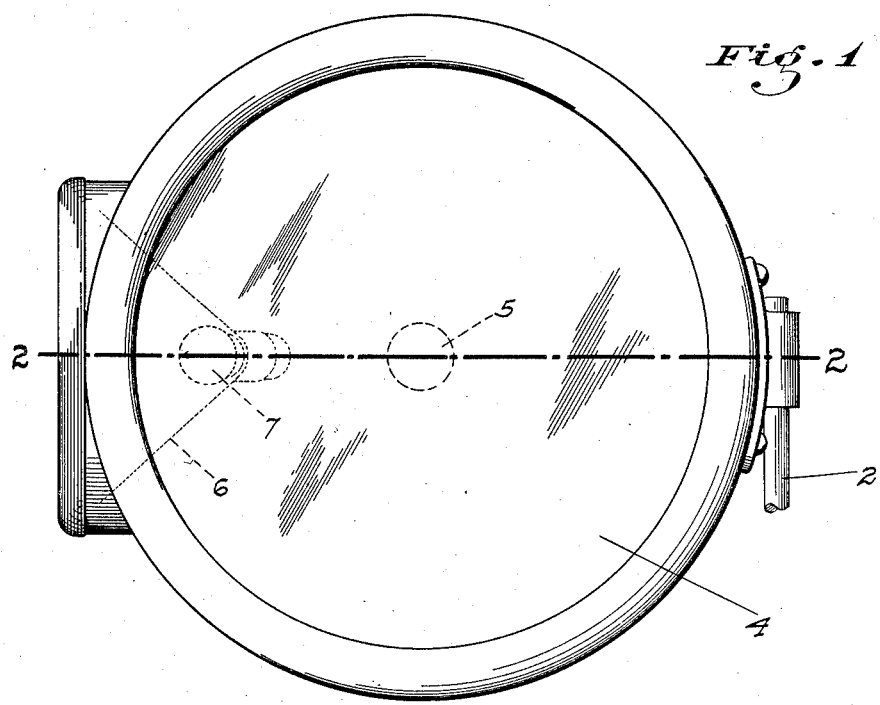
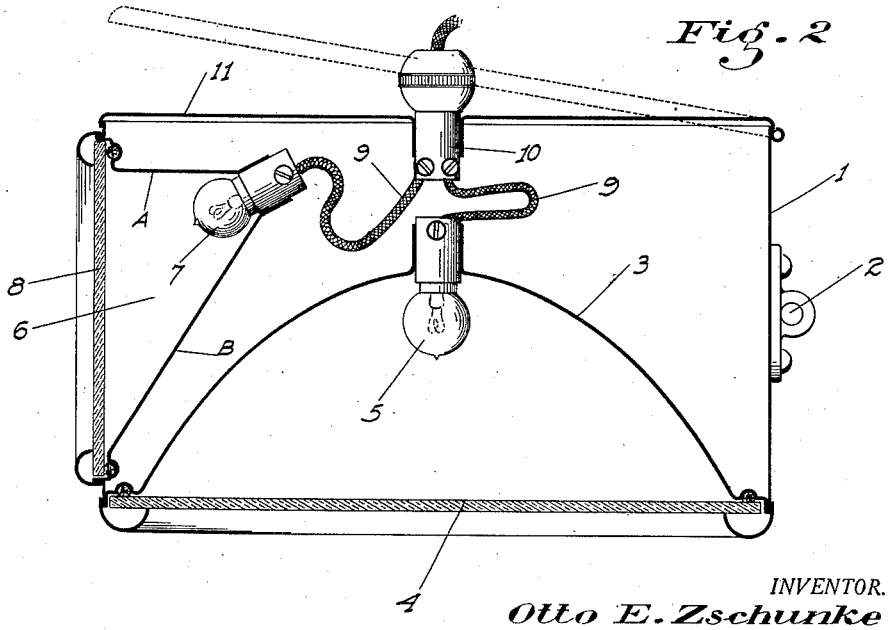
INVENTOR.
Otto E. Zschunke
BY
ATTORNEY Patented Apr. 28, 1925.

1,535,282

UNITED STATES PATENT OFFICE.

OTTO E. ZSCHUNKE, OF LODI, CALIFORNIA.

VEHICLE HEADLIGHT.

Application filed December 28, 1923. Serial No. 683,121.

*To all whom it may concern:*

Be it known that I, OTTO E. ZSCHUNKE, a citizen of the United States, residing at Lodi, county of San Joaquin, State of California, have invented certain new and useful Improvements in Vehicle Headlights; and I do declare the following to be a full, clear, and exact description of the same, reference being had to the accompanying drawings, and to the characters of reference marked thereon, which form a part of this application.

This invention relates to improvements in headlights for road vehicles, and particularly automobiles and other motor vehicles, the principal object of my invention being to construct a headlight for the purpose provided with two separate sources of illumination and individual reflecting means for the same; one reflector being arranged to throw the light ahead of the vehicle in the usual manner, and the other throwing the light to one side of the vehicle and at the same time ahead of the same to a certain extent.

By means of this arrangement, a very efficient illumination of the road to the sides of the vehicle, and which is highly desirable for safe and comfortable night driving is obtained, apart from the straight-ahead light, and without attempting to adjust the latter to serve both purposes, which cannot be efficiently done.

With my double illuminating means, should the straight-ahead lights become burnt out or extinguished for any reason, or should they get out of focus so as to throw a glare into the eyes of oncoming drivers and necessitate their temporary turning out, the side lights, which cannot possibly throw a glare ahead, are ample to allow the driver of the car on which they are mounted to maintain his place on the road. At the same time the driver of the oncoming car may readily see and avoid the other vehicle, so that the passage of the two may be safely made.

Also by these arrangements, all road intersections, corners and curves are fully illuminated, and turns can be more easily and safely made.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views:

Fig. 1 is a front view of my improved headlight, the left-hand one being shown.

Fig. 2 is a cross section of the same taken on the line 2—2 of Fig. 1.

Referring now more particularly to the character of reference on the drawing, the numeral 1 denotes the outer casing of the headlight, preferably of cylindrical cross section or what is termed barrel-shaped. This casing is arranged to be secured to the vehicle in a suitable location clear of the fenders thereof by means of a standard or bracket 2 attached to the casing.

Mounted in the front of the casing is a parabolic reflector 3 of ordinary form, faced by a lens 4 and having a centrally located light-bulb 5 therein, as usual.

Mounted in one side or the other of the casing (the headlights being made right and left hand) and to the rear of the main reflector, is an auxiliary reflector 6, having a light bulb 7 therein, and faced by a lens 8.

This auxiliary reflector, to give the best results, is preferably odd-shaped. In vertical cross section, it is symmetrical relative to its axis, as shown in Fig. 1, and more or less of the ordinary parabolic form.

In horizontal cross section however, the rear face of the reflector 6 is substantially in a plane at right angles to the axial line of the main reflector 3 as shown at A in Fig. 2, while the forward face thereof makes an angle of considerable acuteness with said axial line, as shown at B in Fig. 2.

The latter face of the reflector 6 is preferably as close to the adjacent face of the reflector 3 as it is possible to arrange it in a practicable manner.

The result of this construction is that the greater portion of the light from the bulb 7 will be thrown from the side of the casing at a forward but diverging angle relative to the axis of the reflector 3, while only a small percentage of the light will be thrown rearwardly of the reflector 6.

The two reflectors are preferably so arranged relative to each other that the beams of light from the two adjoin each other, thus providing an unbroken flood of light from the front of the vehicle around to the sides thereof, giving an extremely efficient light for driving purposes.

In order to allow the necessary leads 9 to be readily connected up from the bulbs 5 and 7 to the common binding plug 10, without having to remove the lens and reflectors, the casing is preferably provided at the back with a hinged lid or cover 11, in which said plug 10 is mounted.

The lights are preferably connected up with any suitable switch means so that either one or the other, or both, may be turned on at a time.

Should a single headlight be desired, directly in front of and in the middle of the car, my side lights may be placed on both sides of the main light, thus giving very efficient illumination.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A combination head and side light comprising a primary and a secondary lens at right angles to each other, an independent reflector behind each lens, the axis of the reflector behind the primary lens being substantially concentric with the axis of such lens, the axis of the reflector behind the secondary lens being disposed at an acute angle in a horizontal plane to the axes of both lenses, the horizontal center line of the rear side of the secondary reflector being at right angles to the rearmost edge of the secondary lens, all whereby the light from the primary reflector will be reflected straight ahead while the light from the secondary reflector is reflected at an acute angle to the first light in the same forwardly direction but not back of such secondary lens.

In testimony whereof I affix my signature.

OTTO E. ZSCHUNKE.